United States Patent [19]
Schwindt et al.

[11] 3,979,847
[45] Sept. 14, 1976

[54] METHOD FOR INSTALLING IDENTIFICATION TAG AND TOOL THEREFOR

[75] Inventors: Jackson T. Schwindt; Maurice Aaron Whitney, both of Cody, Wyo.

[73] Assignee: Y-Tex Corporation, Cody, Wyo.

[22] Filed: Apr. 25, 1975

[21] Appl. No.: 571,768

[52] U.S. Cl. .................................................. 40/301
[51] Int. Cl.² ........................................... G09F 3/00
[58] Field of Search ............... 40/300, 301; 128/330

[56] References Cited
UNITED STATES PATENTS

| | | | |
|---|---|---|---|
| 3,334,434 | 8/1967 | Melin | 40/301 |
| 3,512,289 | 5/1970 | Hayes | 40/301 |
| 3,526,987 | 9/1970 | McCarty et al. | 40/301 |
| 3,552,051 | 1/1971 | Ritchey | 40/301 |
| 3,675,357 | 7/1972 | Magee | 40/300 |
| 3,694,949 | 10/1972 | Howe | 40/301 |

*Primary Examiner*—Louis G. Mancene
*Assistant Examiner*—John H. Wolff
*Attorney, Agent, or Firm*—Hume, Clement, Brinks, William, Olds & Cook, Ltd.

[57] ABSTRACT

An improved method and tool for installing an identification tag into the ear of an animal. The tool comprises a handle portion and an elongated insertion portion having an end portion with a flat top surface and opposed blunt edges converging to form a sharp piercing tip. The tool also has engagement means for engaging a portion of an animal identification tag which is to be forced through the ear. In carrying out the method, the pointed tip and blunt edges are forced through the ear of an animal to pierce and stretch the tissue, and to create an opening. A portion of the identification tag is passed through the opening, and the tool is withdrawn while leaving the tag in place.

13 Claims, 7 Drawing Figures

U.S. Patent  Sept. 14, 1976  3,979,847
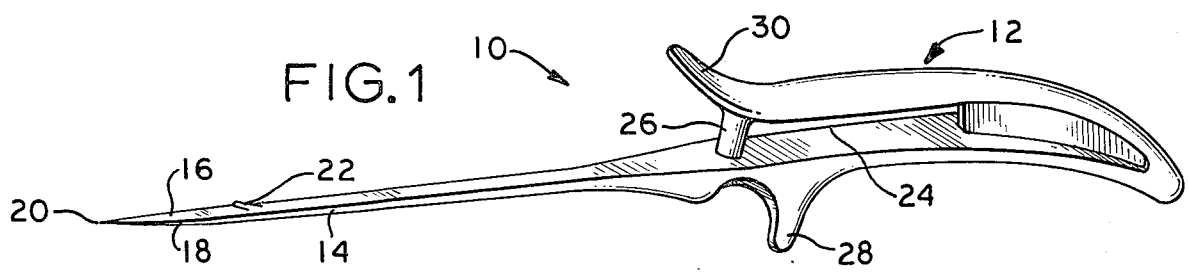
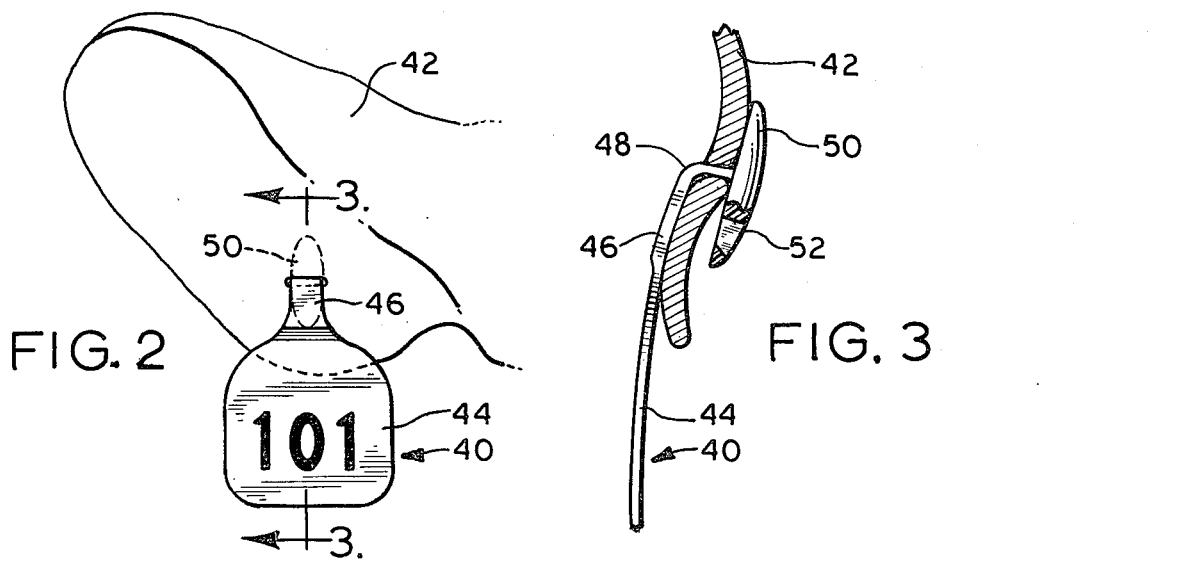
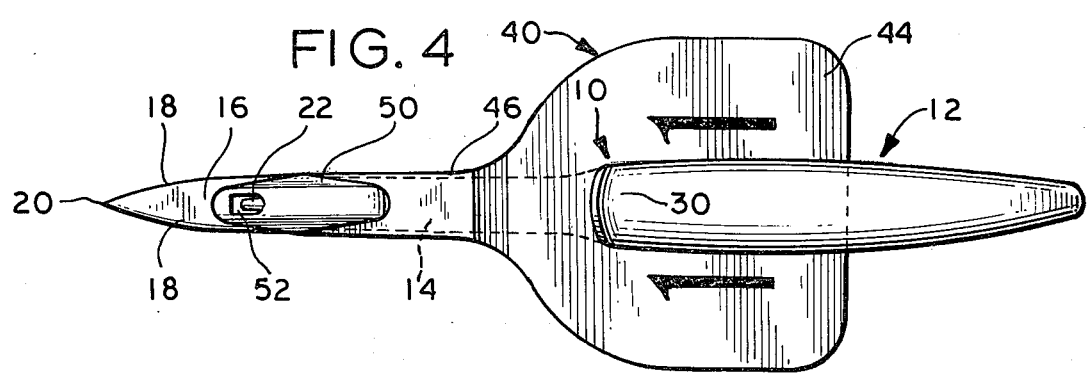
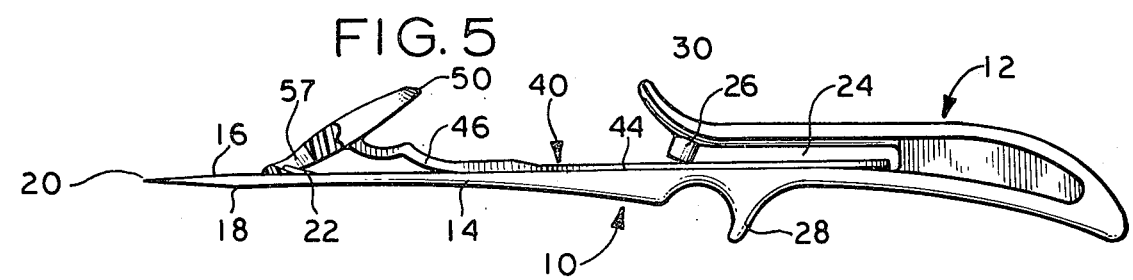
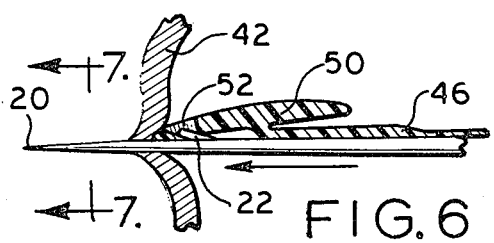
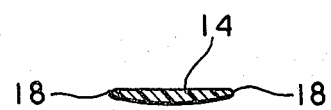

METHOD FOR INSTALLING IDENTIFICATION TAG AND TOOL THEREFOR

The present invention relates to an improved method for installing an animal identification tag into the ear of an animal, and to an improved insertion tool for an animal identification tag or the like.

A wide variety of designs for both animal identification tags and for insertion tools is known in the art. The tags are generally applied to the ear of an animal, primarily cattle, in order to provide readily visible identifying indicia for keeping track of particular animals, breed lines, and the like. The majority of such tags have heretofore been inserted into the ear of the animal by cutting a slit in the ear and by subsequently or simultaneously passing a portion of the ear tag through the slit to permit it to engage the opposite side of the ear. Such methods are illustrated, for example, in U.S. Patents Nos. 3,694,949; 3,552,051; 3,334,434; 3,526,987; and 3,512,289. While these patents illustrate a variety of tags and insertion methods, the insertion tools heretofore employed have as a common feature the requirement for a sharp blade, generally made of metal, which cuts a slit through the ear of the animal in order to permit the tag to be passed therethrough.

Generally, the present invention provides an improved method for installing an animal identification tag into the ear of an animal wherein the ear of the animal is pierced with a tool having a flat top surface and opposed blunt edges converging to form a sharp, piercing tip. Th piercing tip is forced through the ear, and the converging blunt edges then stretch the tissue of the ear around the tool and to create an opening. A portion of the animal identification tag, designed to engage the opposite side of the ear, is passed through the opening, and the tool is withdrawn from the ear, leaving a tightly fitting encirclement of tissue around the tag.

The invention also provides an improved insertion tool for an animal identification tag or the like which is adapted for carrying out the foregoing method. The tool comprises means defining a handle portion together with means defining an elongated insertion portion extending outwardly from the handle portion. The insertion portion has an end portion with a flat top surface and opposed blunt edges converging to form a sharp, piercing tip. The tool also comprises engagement means on the insertion portion for engaging a portion of an animal identification tag which is to be forced through the ear of an animal.

The invention, its construction and method operation, together with the objects and advantages thereof, will be best understood by reference to the following detailed description, taken in conjunction with the drawings, in which:

FIG. 1 is a perspective view of an insertion tool embodying the present invention;

FIG. 2 is an elevation view of a typical ear tag installed in the ear of an animal;

FIG. 3 is a cross-sectional view taken along line 3—3 of FIG. 2;

FIG. 4 is a plan view of the insertion tool shown in FIG. 1 as it appears in engagement with a typical ear tag just prior to installation in an animal;

FIG. 5 is an elevation view of the tool and ear tag shown in FIG. 4;

FIG. 6 is a cross-sectional view illustrating the manner in which the tool of the present invention is employed to insert an ear tag into the ear of an animal; and FIG. 7 is a cross-sectional view taken along line 7—7 of FIG. 6.

In the method of the present invention, an ear tag is inserted into the ear of an animal by piercing and stretching the tissue of the ear around a portion of the tag which passes through the ear, rather than by cutting a slit through the ear. This is accomplished by passing a tool through the ear which has opposed blunt edges converging to form a sharp piercing tip. As the tool stretches the tissue of the ear to create an opening, a portion of the animal identification tag is passed through the opening. The tag is designed such that it will engage the other side of the ear and be held in place. The tool is then withdrawn, so that the tissue tends to snap back, tightly encircling the portion of the ear tag which passes through the ear so that the tag is held in a relatively immobile position.

Referring to FIG. 1, a preferred insertion tool embodying the present invention is generally indicated by reference numeral 10. The tool 10 is preferably made of a unitary piece of rigid material, such as metal, wood, plastic, or the like. Such material should have a hardness of at least about 55, as measured on the Shore D scale, and preferably at least about 70 as measured on the Rockwell E scale. A particularly suitable metal is die-cast aluminum. Suitable plastics include nylon, ABS, polypropylene, Teflon, and polyvinyl chloride. Plastics reinforced with fiberglass are particularly suitable, and even softer plastics such as polyurethane can be used in conjunction with fiberglass. A particularly preferred plastic for use in manufacturing the tool 10 is nylon 6—6 reinforced with 40% fiberglass.

The tool 10 has a handle portion, generally indicated by reference numeral 12, and an elongated insertion portion 14 extending outwardly from the handle portion 12. As best shown in FIG. 4, the insertion portion 14 has an end portion 16 having opposed blunt edges 18 converging to form a sharp piercing tip 20. The insertion portion 14 also has engagment means for engaging a portion of an animal identification tag which is to be passed through the ear of an animal. In the preferred embodiment shown, the engagement means comprises an upstanding pin 22 on top of the insertion portion 14, and positioned toward the forward end thereof. The pin 22 is preferably forwardly inclined in order to more readily engage and release an ear tag as it is installed.

Referring again to FIG. 1, the handle portion 12 preferably includes gripping means for gripping a portion of an ear tag as it is passed through the ear of an animal. In the preferred embodiment shown, these gripping means comprise a generally U-shaped opening 24 which is formed in the handle 22. The opening 24 has its open end facing toward the insertion portion 14, and has a gripping lug 26 which projects downwardly from the top portion of the handle 12. This lug 26 is positioned so that it tightly engages a tag when the handle 12 is squeezed.

In the preferred embodiment, the tool 10 also has a generally trigger-shaped finger-grip portion 28 extending downwardly from the bottom of the tool 10 to aid the operator in gripping the tool 10 and in pulling it outwardly from the ear of an animal. The most preferred embodiment also includes an upwardly inclined portion at the top forward portion of the handle 12.

This inclined portion 30 provides a convenient place for resting the thumb when the insertion portion 14 is passed through the ear of an animal.

Referring to FIGS. 2 and 3, an ear tag adapted to use with the tool shown in FIG. 1 is generally indicated by reference numeral 40, and is shown in position in the ear 42 of an animal such as a steer or the like. As will be understood by those skilled in the art, the tool 10 of the present invention is not limited to use in the insertion of the particular ear tag 40 shown in the drawings, but may be used with a wide variety of ear tags. With varying ear tags it may be necessary to redesign the tool 10 somewhat, particularly the specific design of the engagement means, so that an aperture or other type of engagement means might be substituted for the pin 22 shown in the drawings. It should be understood that the use of any appropriate engagement means is considered to fall within the scope of applicants' invention, even though not illustrated in the preferred embodiment shown in the drawings.

The tag 40 has an identification or indicia-bearing portion 44 which is connected to a relatively narrow neck 46. In this embodiment, the neck 46 has an angular bend 48 of about 90°, so that a short portion of the neck 46 passes through the ear 42, while the remainder of the tag hangs downwardly, as shown in FIG. 3. Attached to the end of the neck 46 opposite the identification portion 44 is an elongated ear-engaging flap 50 which is connected to the end of the neck 44 to form an overall T-shape. The ear-engaging flap 50 has an aperture 52 which is adapted to engage the pin 22 as hereinafter described. As shown in FIGS. 2 and 3, when the tag 40 is positioned in the ear 42, it is held in place on opposite sides of the ear by the ear-engaging flap 50 and the portion of the neck 46 below the angular bend 48.

The manner of positioning the tag 40 on the tool 10 is shown in FIGS. 4 and 5. The aperture 52 is positioned over the pin 22, while the identification portion 44 is placed in the U-shaped opening 24 and under the gripping lug 26. The aperture 52 preferably has an inclined forward edge in order to provide more positive engagement with the pin 22 when the flap 50 is passed through the ear 42 of an animal. The tool 10 is gripped with the hand, preferably by placing the index finger around the finger-grip portion 28 and the thumb against the inclined portion 30. By tightly gripping the tool 10 in this manner, the gripping lug 26 will be forced downwardly onto the identification portion 44, tightly holding the tag 40 in position, as shown, with the neck 46 and flap 50 lying along the insertion portion 14 behind the tip 20.

Referring to FIGS. 6 and 7, to insert the tag 40 into the ear 42 of an animal, the tag and tool are gripped as described, and the piercing tip 20 is forced through the ear 42, so that the tissue is stretched around the converging blunt edges 18 of the insertion portion 14. As shown in FIG. 7, the insertion portion 14 is preferably relatively thin, so that it is easily passed through the ear 42. The insertion portion is passed far enough through the ear so that the ear-engaging flap 50 of the tag 40 also passes through the ear 42. Once this is accomplished, the insertion portion 14 is quickly withdrawn, the flap 50 being readily released because of the forwardly-inclined angle of the pin 22.

Obviously, many modifications and variations of the invention as hereinbefore set forth will occur to those skilled in the art, and it intended to cover in the appended claims all such modifications and variations as fall within the true spirit and scope of the invention.

We claim:

1. An insertion tool for an animal identification tag or the like comprising: means defining a handle portion; means defining an elongated insertion portion extending outwardly from said handle portion, said insertion portion having an end portion with a flat top surface and opposed blunt edges converging to form a sharp piercing tip; and engagement means on said insertion portion for engaging a portion of an animal identification tag which is to be forced through the ear of an animal.

2. The insertion tool as defined in claim 1 wherein said engagement means comprises an upstanding pin on said engagement portion.

3. The insertion tool as defined in claim 2 wherein said pin is forwardly inclined.

4. The insertion tool as defined in claim 1 further comprising a finger-grip portion extending downwardly from the bottom of said tool.

5. The insertion tool as defined in claim 1 wherein said tool is formed of a unitary piece of rigid material.

6. The insertion tool as defined in claim 1 wherein said handle portion includes gripping means for gripping a tag and holding it along said insertion portion.

7. The insertion tool as defined in claim 6 wherein said gripping means comprises means defining a generally U-shaped opening in said handle having an open end facing toward said insertion portion, and a gripping lug projecting downwardly from the top portion of said handle, said gripping means being constructed so that said lug tightly engages a tag when said handle is squeezed.

8. The insertion tool as defined in claim 7 further comprising a finger-grip portion extending downwardly from the bottom of said tool.

9. The insertion tool as defined in claim 8 wherein the top forward portion of said handle portion is upwardly inclined.

10. An insertion tool for an animal identification tag comprising: a unitary piece of rigid plastic material defining a handle portion; an elongated insertion portion extending outwardly from said handle portion; and engagement means; said insertion portion having an end portion with a flat top surface and opposed blunt edges converging to form a sharp piercing tip; said handle portion including a generally U-shaped opening having an open end facing toward said insertion portion and a gripping lug projecting downwardly from the upper portion of said opening, and said handle being constructed so that said lug tightly engages said tag when said handle is squeezed to hold said tag in position along the top of said insertion portion; and said engagement means comprising a forwardly inclined pin on the top of said insertion portion.

11. The insertion tool as defined in claim 10 further comprising a finger-grip portion extending downwardly from the bottom of said tool;

12. The insertion tool as defined in claim 11 wherein the top forward portion of said handle portion is upwardly inclined.

13. An improved method for installing an animal identification tag into the ear of an animal comprising: piercing the ear of an animal with a tool having a flat top surface and opposed blunt edges converging to form a sharp piercing tip; forcing said point and said blunt edges through said ear, whereby to pierce and stretch the tissue of said ear and to create an opening; passing a portion of an animal identification tag through said opening; and withdrawing said tool from said ear while leaving said identification tag in place.

* * * * *